United States Patent
Liu

(10) Patent No.: US 11,797,223 B2
(45) Date of Patent: Oct. 24, 2023

(54) BASIC STORAGE UNIT MANAGEMENT CIRCUIT AND BASIC STORAGE UNIT MANAGEMENT METHOD FOR IDLE BASIC STORAGE UNITS

(71) Applicant: Realtek Semiconductor Corp., HsinChu (TW)

(72) Inventor: Chih-Hao Liu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 47 days.

(21) Appl. No.: 17/578,493

(22) Filed: Jan. 19, 2022

(65) Prior Publication Data

US 2023/0153025 A1    May 18, 2023

(30) Foreign Application Priority Data

Nov. 17, 2021    (TW) .................................. 110142723

(51) Int. Cl.
*G06F 3/06* (2006.01)
(52) U.S. Cl.
CPC .......... *G06F 3/0656* (2013.01); *G06F 3/0604* (2013.01); *G06F 3/0673* (2013.01)

(58) Field of Classification Search
CPC .... G06F 3/0656; G06F 3/0604; G06F 3/0673; G06F 3/0634
USPC ......................................................... 711/156
See application file for complete search history.

(56) References Cited

U.S. PATENT DOCUMENTS

| | | | |
|---|---|---|---|
| 11,593,262 B1* | 2/2023 | Henze ................... | G06F 3/0679 |
| 2012/0278530 A1* | 11/2012 | Ebsen ................. | G06F 13/1684 |
| | | | 711/E12.008 |
| 2018/0173598 A1* | 6/2018 | Zeng ..................... | G06F 3/0673 |
| 2022/0413743 A1* | 12/2022 | Neverovitch ........... | G06F 3/067 |

* cited by examiner

*Primary Examiner* — Than Nguyen
(74) *Attorney, Agent, or Firm* — Winston Hsu

(57) ABSTRACT

A basic storage unit management circuit includes a receiving circuit, a transmitting circuit, a first buffer, and an idle basic storage unit controller. The first buffer is arranged to store a bit map, wherein the bit map includes a plurality of first bits that correspond to a plurality of basic storage units, respectively, and each of the plurality of first bits is arranged to label whether a corresponding basic storage unit is an idle basic storage unit. The idle basic storage unit controller is coupled to the receiving circuit, the transmitting circuit, and the first buffer, and is arranged to manage the bit map stored by the first buffer, and process at least one basic storage unit of at least one packet that is received by the receiving circuit or is transmitted by the transmitting circuit.

9 Claims, 4 Drawing Sheets

BASIC STORAGE UNIT MANAGEMENT CIRCUIT AND BASIC STORAGE UNIT MANAGEMENT METHOD FOR IDLE BASIC STORAGE UNITS

BACKGROUND OF THE INVENTION

1. Field of the Invention

The present invention is related to data management, and more particularly, to a basic storage unit management circuit and a basic storage unit management method for idle basic storage units.

2. Description of the Prior Art

Ina conventional switch, router, or media access control (MAC), a memory (e.g. a static random access memory, SRAM) is usually divided into a plurality of basic storage units. A multi-bit idle basic storage unit link list may be utilized to manage idle basic storage units therein. Some problems may occur, however. Since an address of an idle basic storage unit in the multi-bit idle basic storage unit link list is stored in the previous idle basic storage unit, the size of the multi-bit idle basic storage unit link list may be increased, thereby increasing the cost and access time. In addition, throughput of getting/releasing idle basic storage units may be limited by the bandwidth of the memory. As a result, a novel architecture is urgently needed to replace the multi-bit idle basic storage unit link list.

SUMMARY OF THE INVENTION

It is therefore one of the objectives of the present invention to provide a basic storage unit management circuit and associated basic storage unit management method, to address the above-mentioned issue.

According to at least one embodiment of the present invention, a basic storage unit management circuit is provided. The basic storage unit management circuit may include a receiving circuit, a transmitting circuit, a first buffer, and an idle basic storage unit controller. The first buffer may be arranged to store a bit map, wherein the bit map may include a plurality of first bits that correspond to a plurality of basic storage units, respectively, and each of the plurality of first bits may be arranged to label whether a corresponding basic storage unit is an idle basic storage unit. The idle basic storage unit controller may be coupled to the receiving circuit, the transmitting circuit, and the first buffer, and may be arranged to manage the bit map stored by the first buffer, and process at least one basic storage unit that corresponds to at least one packet received by the receiving circuit or transmitted by the transmitting circuit, wherein when a basic storage unit of the plurality of basic storage units is an idle basic storage unit, the idle basic storage unit controller sets a first bit corresponding to the basic storage unit as a first logic value; and when the basic storage unit of the plurality of basic storage units is not the idle basic storage unit, the idle basic storage unit controller sets the first bit corresponding to the basic storage unit as a second logic value.

According to at least one embodiment of the present invention, a basic storage unit management method is provided. The basic storage unit management method may include: storing a bit map, wherein the bit map comprises a plurality of first bits that correspond to a plurality of basic storage units, respectively, and each of the plurality of first bits is arranged to label whether a corresponding basic storage unit is an idle basic storage unit; and utilizing an idle basic storage unit controller to manage the bit map, and processing at least one basic storage unit that corresponds to at least one packet received by a receiving circuit or transmitted by a transmitting circuit, wherein when a basic storage unit of the plurality of basic storage units is an idle basic storage unit, the idle basic storage unit controller sets a first bit corresponding to the basic storage unit as a first logic value; and when the basic storage unit of the plurality of basic storage units is not the idle basic storage unit, the idle basic storage unit controller sets the first bit corresponding to the basic storage unit as a second logic value.

One of the benefits of the present invention is that the basic storage unit management circuit may utilize the memory buffer that stores the bit map and the register buffer to manage the idle basic storage units. The idle basic storage unit controller of the basic storage unit management circuit finds a target second bit from the plurality of second bits of the register buffer via the first logic value to obtain a read address, then reads a target valid idle storage unit labeled field in the bit map of the memory buffer according to the read address, and finds at least one target first bit via the first logic value from the target valid idle storage unit labeled field, to obtain at least one idle basic storage unit. In this way, the time of reading the memory buffer may be reduced greatly. In addition, in order to reduce the power consumption of the memory buffer and save the bandwidth of the memory buffer, the present invention further provides a basic storage unit management circuit that includes a release basic storage unit buffer, wherein the release basic storage unit buffer may be arranged to reduce the number of accesses to the memory buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
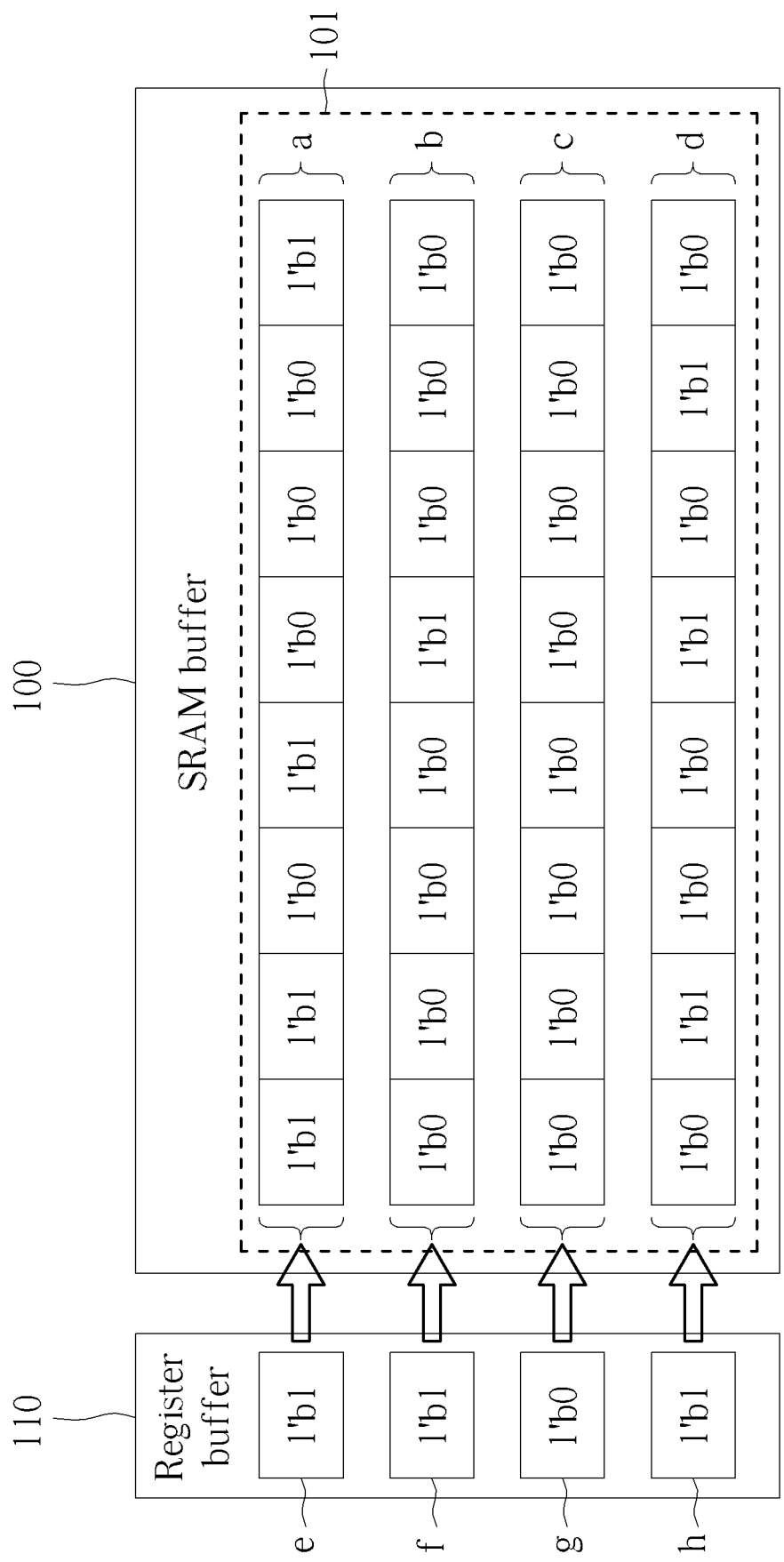
FIG. 1 is a diagram illustrating a relationship between bits in a memory buffer and bits in a register buffer according to an embodiment of the present invention.

FIG. 1 is a diagram illustrating a relationship between bits in a memory buffer and bits in a register buffer according to an embodiment of the present invention. As shown in FIG. 1, a memory buffer (e.g. an SRAM buffer 100) may be arranged to store a bit map 101, wherein the bit map may include 32 first bits that respectively correspond to 32 basic storage units, and each of the 32 first bits may be arranged to label whether a corresponding basic storage unit is an idle basic storage unit. For example, when a basic storage unit in the 32 basic storage units is an idle basic storage unit, a first bit that corresponds to the basic storage unit is a first logic value (e.g. 1); and when a basic storage unit in the 32 basic storage units is not an idle basic storage unit, a first bit that corresponds to the basic storage unit is a second logic value (e.g. 0). In addition, in order to save access time of the memory buffer and find the idle basic storage units more quickly, the bit map may be divided into a plurality of valid idle storage unit labeled fields with a plurality of bits as a unit. For example, M×N first bits in the bit map 101 may be divided into N (e.g. N=4) valid idle storage unit labeled fields (e.g. valid idle storage unit labeled field a–valid idle storage unit labeled field d) with M (e.g. M=8) bits as a unit.

The register buffer 110 may be arranged to store 4 second bits (e.g. second bit e–second bit h), wherein each of the 4 second bits may be arranged to indicate whether a corresponding valid idle storage unit labeled field includes at least one first bit with the first logic value (e.g. 1). That is, each of the 4 second bits may be arranged to indicate whether 8 basic storage units corresponding to 8 first bits in the corresponding valid idle storage unit labeled field include at least one idle basic storage unit. When a valid idle storage unit labeled field in the 4 valid idle storage unit labeled fields includes at least one first bit with the first logic value (e.g. 1), a second bit corresponding to the valid idle storage unit labeled field is the first logic value (e.g. 1). When all of the 8 first bits included in a valid idle storage unit labeled field in the 4 valid idle storage unit labeled fields are the second logic value (e.g. 0), the second bit corresponding to the valid idle storage unit labeled field is the second logic value (e.g. 0). That is, if there is no idle basic storage unit in the 8 basic storage units corresponding to the 8 first bits in the valid idle storage unit labeled field, the second bit corresponding to the valid idle storage unit labeled field is the second logic value (e.g. 0). For example, since the valid idle storage unit labeled field a in the bit map 101 has 4 first bits with the first logic value (e.g. 1), the second bit e corresponding to the valid idle storage unit labeled field a is the first logic value (e.g. 1). In another example, since all of the first bits included in the valid idle storage unit labeled field c in the bit map 101 are second logic value (e.g. 0), the second bit g corresponding to the valid idle storage unit labeled field c is the second logic value (e.g. 0).

Figure 2:
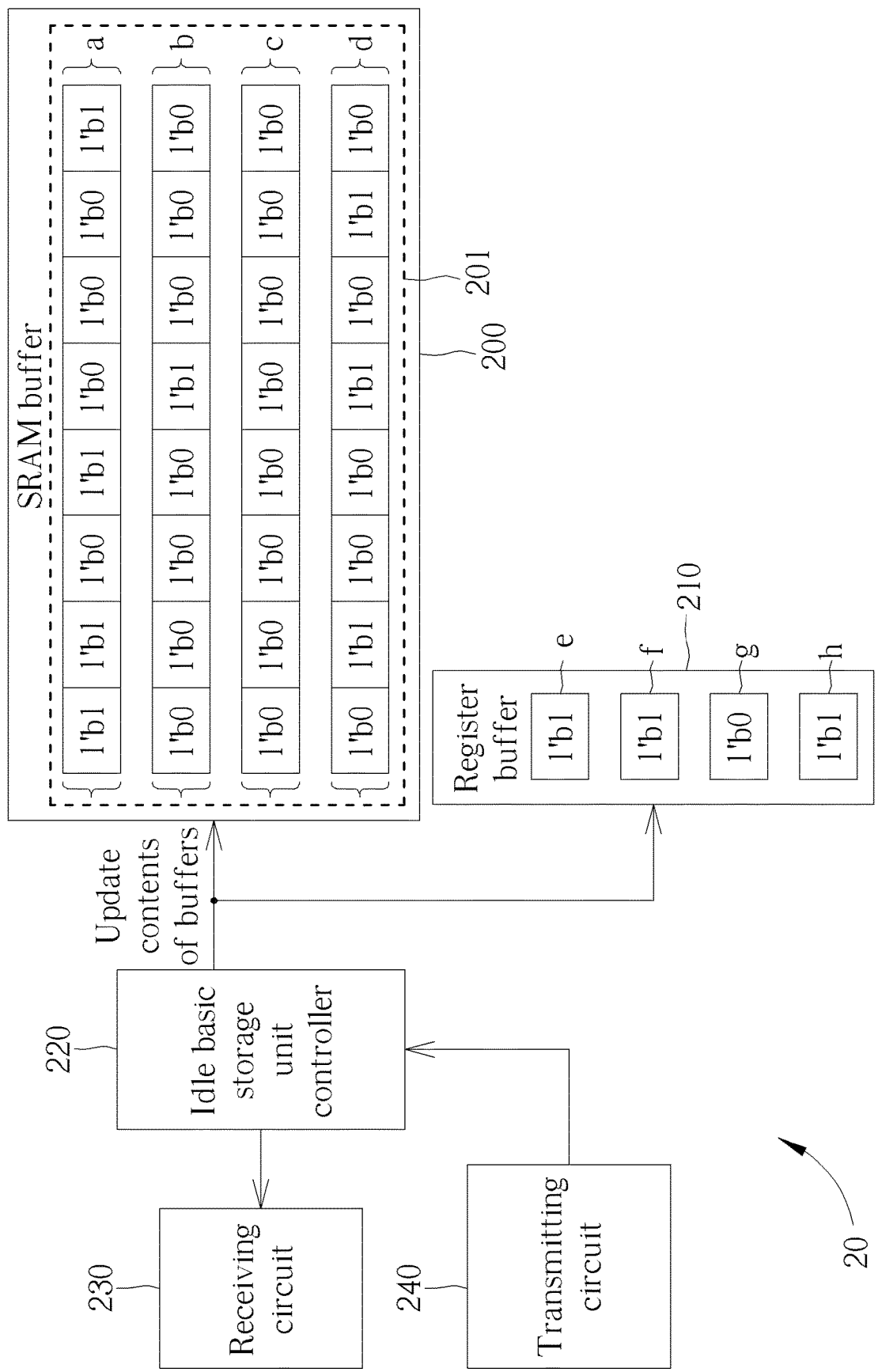
FIG. 2 is a diagram illustrating a basic storage unit management circuit according to an embodiment of the present invention.

FIG. 2 is a diagram illustrating a basic storage unit management circuit 20 according to an embodiment of the present invention. As shown in FIG. 2, the basic storage unit management circuit 20 may include a memory buffer (e.g. an SRAM buffer 200), a register buffer 210, an idle basic storage unit controller 220, a receiving circuit 230 and a transmitting circuit 240, wherein the SRAM buffer 200 and the register buffer 210 may be implemented by, respectively, the SRAM buffer 100 and the register buffer 110 shown in FIG. 1. The SRAM buffer 200 may be arranged to store a bit map 201. In this embodiment, the bit map 201 may include 32 first bits (which correspond to 32 basic storage units, respectively), and the 32 first bits are divided into 4 valid idle storage unit labeled fields (e.g. the valid idle storage unit labeled field a—the valid idle storage unit labeled field d) with 8 bits as a unit. The present invention is not limited thereto, however. In practice, the size of the bit map 201 and the number of the valid idle storage unit labeled fields may be adjusted according to design requirements. The register buffer 210 may be arranged to store 4 second bits (e.g. the second bit e—the second bit h, which correspond to the valid idle storage unit labeled field a—the valid idle storage unit labeled field d in the bit map 201, respectively). This is for illustration only, and is not meant to be a limitation of the present invention. In practice, the number of second bits stored by the register buffer 210 may depend on the number of valid idle storage unit labeled fields of the bit map 201. For brevity, similar descriptions for the SRAM buffer 200 and the register buffer 210 are not repeated in detail here.

The idle basic storage unit controller 220 may be coupled to the SRAM buffer 200, the receiving circuit 230, and the transmitting circuit 240, and may be arranged to manage the bit map 201 stored by the SRAM buffer 200, and process at least one basic storage unit of at least one packet that is received by the receiving circuit 230 or transmitted by the transmitting circuit 240. When a basic storage unit in 32 basic storage units that correspond to the 32 first bits of the bit map 201 is the idle basic storage unit, the idle basic storage unit controller 220 may set a first bit that corresponds to the basic storage unit as the first logic value (e.g. 1). When a basic storage unit in 32 basic storage units that correspond to the 32 first bits of the bit map 201 is not the idle basic storage unit, the idle basic storage unit controller 220 may set the first bit that corresponds to the basic storage unit as the second logic value (e.g. 0). In addition, the idle basic storage unit controller 220 may be further coupled to the register buffer 210. When a valid idle storage unit labeled field in the 4 valid idle storage unit labeled fields of the bit map 201 includes at least one first bit with the first logic value (e.g. 1), the idle basic storage unit controller 220 may set a second bit that corresponds to the valid idle storage unit labeled field as the first logic value (e.g. 1). When all of the first bits included in a valid idle storage unit labeled field in the 4 valid idle storage unit labeled fields of the bit map 201 are the second logic value (e.g. 0), the idle basic storage unit controller 220 may set a second bit that corresponds to the valid idle storage unit labeled field as the second logic value (e.g. 0).

When the receiving circuit 230 receives a packet, the idle basic storage unit controller 220 may obtain at least one idle basic storage unit through the SRAM buffer 200 and the register buffer 210 for temporarily storing the received packet. For example, the idle basic storage unit controller 220 may first find a target second bit with the first logic value (e.g. 1), such as the second bit e, the second f, or the second bit h, from the 4 second bits (e.g. the second bit e—the second bit h) of the register buffer 210, to obtain a read address, and read a target valid idle storage unit labeled field (e.g. the valid idle storage unit labeled field a corresponding to the second bit e, the valid idle storage unit labeled field b corresponding to the second bit f, or the valid idle storage unit labeled field d corresponding to the second bit h) in the bit map 201 of the SRAM buffer 200 according to the read address. Then, the idle basic storage unit controller 220 may find at least one target first bit with the first logic value (e.g. 1) from the target valid idle storage unit labeled field, to obtain at least one idle basic storage unit.

It should be noted that, after the received packet is temporarily stored by the at least one idle basic storage unit, the idle basic storage unit controller 220 may be further arranged to update the at least one target first bit corresponding to the at least one idle basic storage unit from the first logic value (e.g. 1) to the second value (e.g. 0). In addition, after the at least one target first bit corresponding to the at least one idle basic storage unit is updated by the idle basic storage unit controller 220, if all of the first bits in the target valid idle storage unit labeled field that includes the at least one target first bit are the second bits (e.g. 0), the idle basic storage unit controller 220 may be further arranged to update a second bit corresponding to the target valid idle storage unit labeled field from the first logic value (e.g. 1) to the second logic value (e.g. 0). On the other hand, after the at least one target first bit corresponding to the at least one idle basic storage unit is updated by the idle basic storage unit controller 220, if at least one first bit with the logic value (e.g. 1) is still included in the target valid idle storage unit labeled field that includes the at least one target first bit, the idle basic storage unit controller 220 may be further arranged to keep a second bit that corresponds to the target valid idle storage unit labeled field in the register buffer 210 as the first logic value (e.g. 1). The idle basic storage unit controller 220 may realize updates of the 32 first bits in the bit map 201 of the SRAM buffer 200 and the 4 second bits of the register buffer 210 by pipeline, but the present invention is not limited thereto.

When the transmitting circuit 240 finishes transmitting a packet, the transmitting circuit 240 releases at least one basic storage unit that corresponds to the transmitted packet to the idle basic storage unit controller 220. The idle basic storage unit controller 220 may be arranged to update at least one target first bit in at least one target valid idle storage unit labeled field in the bit map 201 of the SRAM buffer 200 from the second logic value (e.g. 0) to the first logic value (e.g. 1) according to the at least one basic storage unit of the transmitted packet. That is, at least one basic storage unit that corresponds to the at least one target first bit is at least one idle basic storage unit. In addition, under the condition that all of the at least one target first bit of the original at least one target valid idle storage unit labeled field are the second logic value (e.g. 0) (i.e. the original at least one target valid idle storage unit labeled field does not include idle basic storage units), after the at least one target first bit is updated by the idle basic storage unit controller 220, if at least one first bit with the first logic value (e.g. 1) is included in the at least one target valid idle storage unit labeled field that includes the at least one target first bit, the idle basic storage unit controller 220 may be further arranged to update at least one second bit that corresponds to the at least one target valid idle storage unit labeled field in the register buffer 210 from the second logic value (e.g. 0) to the first logic value (e.g. 1). On the other hand, under the condition that at least one first bit with the first logic value (e.g. 1) has already been included in the original at least one target valid idle storage unit labeled field (i.e. the original at least one target valid idle storage unit labeled field has already included idle basic storage units), the idle basic storage unit controller 220 may be further arranged to keep at least one second bit corresponding to the at least one target valid idle storage unit labeled field as the first logic value (e.g. 1).

Figure 3:
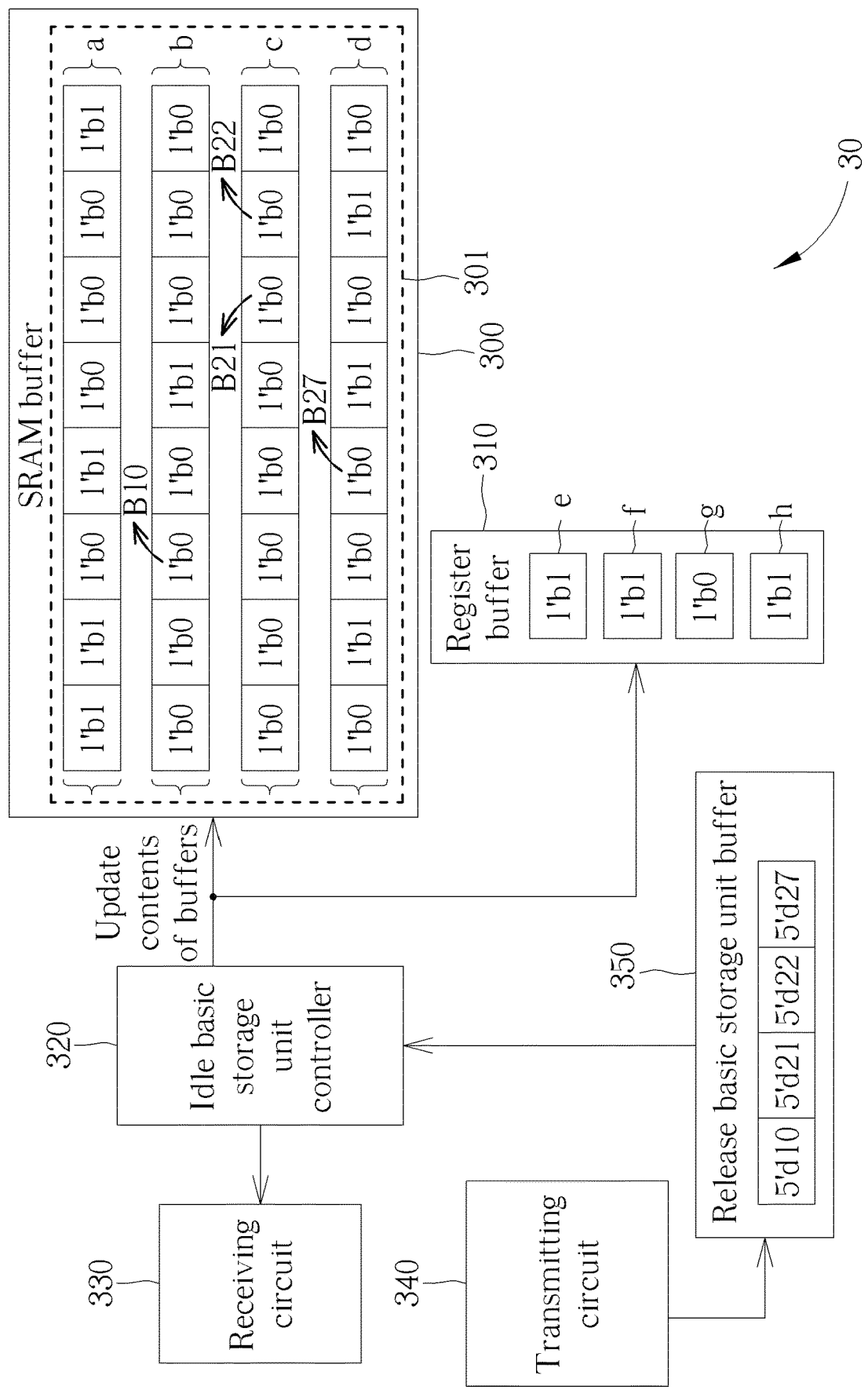
FIG. 3 is a diagram illustrating a basic storage unit management circuit according to another embodiment of the present invention.

In addition, in order to reduce the power consumption and save the bandwidth of the memory buffer, the number of accesses to the memory buffer may be reduced by utilizing a release basic storage unit buffer. FIG. 3 is a diagram illustrating a basic storage unit management circuit 30 according to another embodiment of the present invention. As shown in FIG. 3, the basic storage unit management circuit 30 may include a memory buffer (e.g. an SRAM buffer 300), a register buffer 310, an idle basic storage unit controller 320, a receiving circuit 330, a transmitting circuit 340, and a release basic storage unit buffer 350. The difference between the basic storage unit management circuit 30 shown in FIG. 3 and the basic storage unit management circuit 20 shown in FIG. 2 is that the basic storage unit management circuit 30 may further include the release basic storage unit buffer 350. The release basic storage unit buffer 350 may be coupled to the idle basic storage unit controller 320 and the transmitting circuit 340, and may be arranged to temporarily store at least one basic storage unit that corresponds to a transmitted packet and is released after the transmitting circuit 340 finishes transmitting the packet. The idle basic storage unit controller 320 may obtain the at least one basic storage unit corresponding to the transmitted packet from the release basic storage unit buffer 350, to act as the idle basic storage unit. In this way, when the receiving circuit 330 receives a packet, the idle basic storage unit controller 320 may read the at least one basic storage unit that corresponds to the transmitted packet and is temporarily stored by the release basic storage unit buffer 350 in advance for the received packet, without obtaining the idle basic storage units through the SRAM buffer 300 and the register buffer 310 (which reduces the number of accesses to the SRAM buffer 300).

In this embodiment, the release basic storage unit buffer 350 may temporarily store an idle basic storage unit corresponding to a first bit B10 (which is temporarily stored in the release basic storage unit buffer 350 by 5 bits with the decimal value of 10, labeled as "5'd10" in FIG. 3), an idle basic storage unit corresponding to a first bit B21 (which is temporarily stored in the release basic storage unit buffer 350 by 5 bits with the decimal value of 21, labeled as "5'd21" in FIG. 3), an idle basic storage unit corresponding to a first bit B22 (which is temporarily stored in the release basic storage unit buffer 350 by 5 bits with the decimal value of 22, labeled as "5'd22" in FIG. 3), and an idle basic storage unit corresponding to a first bit B27 (which is temporarily stored in the release basic storage unit buffer 350 by 5 bits with the decimal value of 27, labeled as "5'd27" in FIG. 3) in the SRAM buffer 300. It should be noted that, when all of the at least one basic storage unit that corresponds to the transmitted packet and is temporarily stored in the release basic storage unit buffer 350 are occupied (i.e. there are no idle basic storage units in the release basic storage unit buffer 350), the idle basic storage unit controller 320 may find a target second bit with the first logic value (e.g. 1) from the 4 second bits of the register buffer 310, to obtain a read address, and read a target valid idle storage unit labeled field in the bit map 301 of the SRAM buffer 300 according to the read address. Then, the idle basic storage unit controller 320 may find at least one target first bit with the first logic value (e.g. 1) from the target valid idle storage unit labeled field, to obtain at least one idle basic storage unit for the received packet. In other words, if the release basic storage unit buffer 350 has the idle basic storage units for the received packet, the idle basic storage unit controller 320 may give priority to read the release basic storage unit buffer 350. If the desired idle basic storage unit cannot be obtained from the release basic storage unit buffer 350, the idle basic storage unit controller 320 may obtain the idle basic storage units through the SRAM buffer 300 and the register buffer 310.

In the above-mentioned embodiments, the idle basic storage unit controller 220 (or the idle basic storage unit controller 320) may quickly find the first bits that label the idle basic storage units from the bit map 201/301 of the SRAM buffer 200/300 through the second bits stored in the register buffer 210/310. The register buffer may be an optional component, however. For example, in some embodiments, the basic storage unit management circuit 20/30 may save the register buffer 210/310, and directly search the bit map 201/301 of the SRAM buffer 200/300, to find the first bits that label the idle basic storage units. In summary, any basic storage unit management circuit that utilizes bits recorded by the bit map to label whether the corresponding basic storage units are idle basic storage units will fall within the scope of the present invention.

Figure 4:
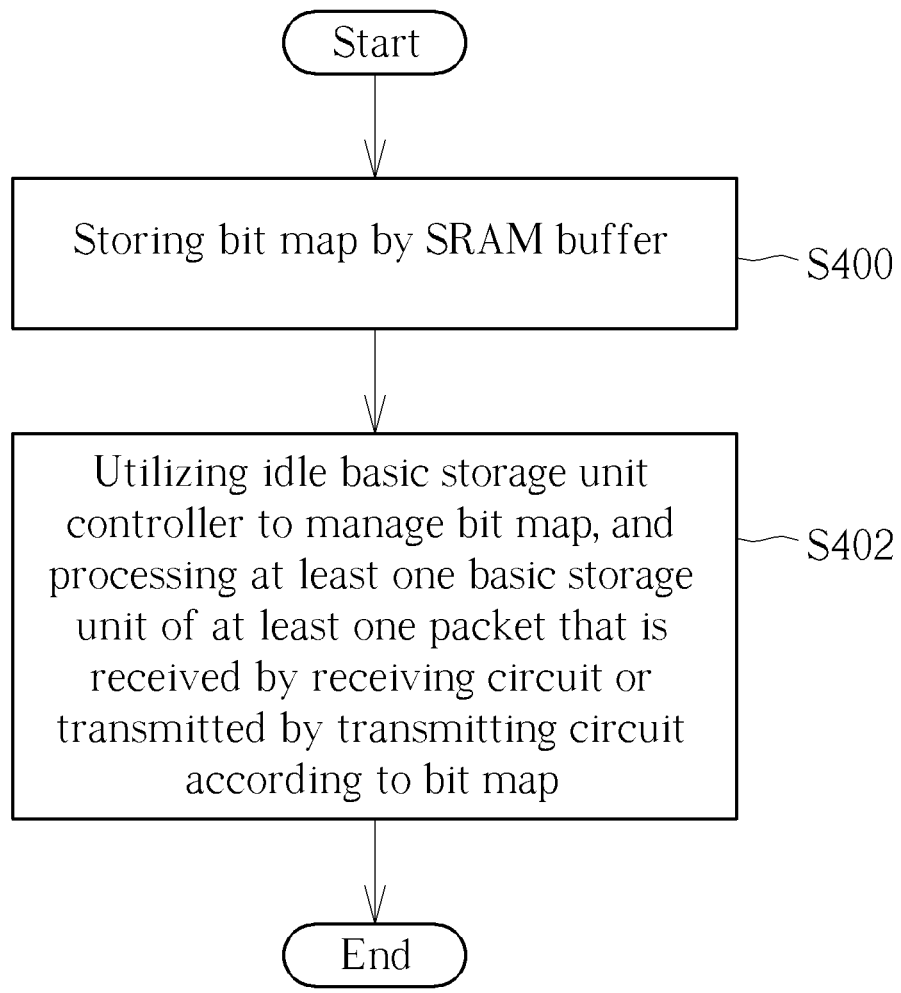
FIG. 4 is a flowchart of a basic storage unit management method according to an embodiment of the present invention.

FIG. 4 is a flowchart of a basic storage unit management method according to an embodiment of the present invention. Provided that the result is substantially the same, the steps are not required to be executed in the exact order shown in FIG. 4. For example, the basic storage unit management method shown in FIG. 4 may be employed by the basic storage unit management circuit 20 shown in FIG. 2 or the basic storage unit management circuit 30 shown in FIG. 3.

In Step S400, the SRAM buffer may store a bit map, wherein the bit map may include a plurality of first bits that correspond to a plurality of basic storage units, respectively, and each of the plurality of first bits may be arranged to label whether a corresponding basic storage unit is an idle basic storage unit.

In Step S402, an idle basic storage unit controller may be utilized to manage the bit map, and process the at least one basic storage unit of the at least one packet that is received by a receiving circuit or is transmitted by a transmitting circuit. When a basic storage unit of the plurality of basic storage units is an idle basic storage unit, the idle basic storage unit controller may set a first bit corresponding to the basic storage unit as a first logic value. When a basic storage unit of the plurality of basic storage units is not an idle basic storage unit, the idle basic storage unit controller may set a first bit corresponding to the basic storage unit as a second logic value.

Since a person skilled in the pertinent art can readily understand details of the steps in FIG. 4 after reading the above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A basic storage unit management circuit, comprising:
   a receiving circuit;
   a transmitting circuit;
   a first buffer, arranged to store a bit map, wherein the bit map comprises a plurality of first bits that correspond to a plurality of basic storage units, respectively, and each of the plurality of first bits is arranged to label whether a corresponding basic storage unit is an idle basic storage unit;
   an idle basic storage unit controller, coupled to the receiving circuit, the transmitting circuit, and the first buffer, and arranged to manage the bit map stored by the first buffer, and process at least one basic storage unit that corresponds to at least one packet received by the receiving circuit or transmitted by the transmitting circuit, wherein when a basic storage unit of the plurality of basic storage units is an idle basic storage unit, the idle basic storage unit controller sets a first bit corresponding to the basic storage unit as a first logic value; when the basic storage unit of the plurality of basic storage units is not the idle basic storage unit, the idle basic storage unit controller sets the first bit corresponding to the basic storage unit as a second logic value; and the plurality of first bits in the bit map are divided into a plurality of valid idle storage unit labeled fields; and
   a second buffer, coupled to the idle basic storage unit controller, and arranged to store a plurality of second bits that corresponds to the plurality of valid idle storage unit labeled fields, wherein each of the plurality of second bits is arranged to indicate whether a corresponding valid idle storage unit labeled field comprises at least one first bit with the first logic value;
   wherein when a valid idle storage unit labeled field of the plurality of valid idle storage unit labeled fields comprises the at least one first bit with the first logic value, the idle basic storage unit controller sets a second bit corresponding to the valid idle storage unit labeled field as one of the first logic value and the second logic value; and when all of the first bits comprised in the valid idle storage unit labeled field of the plurality of valid idle storage unit labeled fields are the second logic value, the idle basic storage unit controller sets the second bit corresponding to the valid idle storage unit labeled field as another of the first logic value and the second logic value.

2. The basic storage unit management circuit of claim 1, wherein when the receiving circuit receives a packet, the idle basic storage unit controller finds a target second bit with the one of the first logic value and the second logic value from the plurality of second bits of the second buffer first, to obtain a read address, reads a target valid idle storage unit labeled field in the bit map of the first buffer according to the read address, and finds at least one target first bit with the first logic value from the target valid idle storage unit labeled field, to obtain at least one idle basic storage unit.

3. The basic storage unit management circuit of claim 2, wherein the idle basic storage unit controller is further arranged to update the at least one target first bit from the first logic value to the second logic value.

4. The basic storage unit management circuit of claim 1, wherein when the transmitting circuit finishes transmitting a packet, the transmitting circuit releases at least one basic storage unit that corresponds to the transmitted packet to the idle basic storage unit controller.

5. The basic storage unit management circuit of claim 4, wherein the idle basic storage unit controller is further arranged to update at least one target first bit in at least one target valid idle storage unit labeled field in the bit map of the first buffer from the second logic value to the first logic value according to the least one basic storage unit of the transmitted packet.

6. The basic storage unit management circuit of claim 1, further comprising:
   a release basic storage unit buffer, coupled to the transmitting circuit and the idle basic storage unit controller, and arranged to temporarily store at least one basic storage unit that corresponds to a transmitted packet and is released when the transmission circuit finishes transmitting the packet, wherein the idle basic storage unit controller obtains the at least one basic storage unit corresponding to the transmitted packet from the release basic storage unit buffer, to act as at least one idle basic storage unit.

7. The basic storage unit management circuit of claim 6, wherein when the receiving circuit receives a packet, the idle basic storage unit controller reads the at least one basic storage unit that corresponds to the transmitted packet and is temporarily stored by the release basic storage unit buffer for the received packet.

8. The basic storage unit management circuit of claim 7, wherein when the at least one basic storage unit that corresponds to the transmitted packet and is temporarily stored by the release basic storage unit buffer is occupied, the idle basic storage unit controller finds a target second bit with the one of the first logic value and the second logic value from the plurality of second bits of the second buffers, to obtain a read address, reads a target valid idle storage unit labeled field in the bit map of the first buffer, and finds at least one target first bit with the first logic value from the target valid idle storage unit labeled field, to obtain at least one idle basic storage unit for the received packet.

9. A basic storage unit management method, comprising:
storing a bit map, wherein the bit map comprises a plurality of first bits that correspond to a plurality of basic storage units, respectively, and each of the plurality of first bits is arranged to label whether a corresponding basic storage unit is an idle basic storage unit;
utilizing an idle basic storage unit controller to manage the bit map, and processing at least one basic storage unit that corresponds to at least one packet received by a receiving circuit or transmitted by a transmitting circuit, wherein when a basic storage unit of the plurality of basic storage units is an idle basic storage unit, the idle basic storage unit controller sets a first bit corresponding to the basic storage unit as a first logic value; and when the basic storage unit of the plurality of basic storage units is not the idle basic storage unit, the idle basic storage unit controller sets the first bit corresponding to the basic storage unit as a second logic value;
dividing the plurality of first bits in the bit map into a plurality of valid idle storage unit labeled fields; and
storing a plurality of second bits that corresponds to the plurality of valid idle storage unit labeled fields, wherein each of the plurality of second bits is arranged to indicate whether a corresponding valid idle storage unit labeled field comprises at least one first bit with the first logic value; when a valid idle storage unit labeled field of the plurality of valid idle storage unit labeled fields comprises the at least one first bit with the first logic value, the idle basic storage unit controller sets a second bit corresponding to the valid idle storage unit labeled field as one of the first logic value and the second logic value; and when all of the first bits comprised in the valid idle storage unit labeled field of the plurality of valid idle storage unit labeled fields are the second logic value, the idle basic storage unit controller sets the second bit corresponding to the valid idle storage unit labeled field as another of the first logic value and the second logic value.

* * * * *